United States Patent
Garner et al.

(10) Patent No.: US 10,110,943 B2
(45) Date of Patent: Oct. 23, 2018

(54) FLEXIBLE OUTPUT OF STREAMING MEDIA

(71) Applicant: Roku, Inc., Saratoga, CA (US)

(72) Inventors: Gregory M. Garner, Saratoga, CA (US); Anthony Wood, Saratoga, CA (US); Gregory S. Gates, Saratoga, CA (US); Michael Chin-Ming Fu, Cupertino, CA (US)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 15/225,338

(22) Filed: Aug. 1, 2016

(65) Prior Publication Data
US 2018/0035155 A1     Feb. 1, 2018

(51) Int. Cl.
| | |
|---|---|
| G06F 3/00 | (2006.01) |
| G06F 13/00 | (2006.01) |
| H04N 5/445 | (2011.01) |
| H04N 7/173 | (2011.01) |
| H04N 21/41 | (2011.01) |
| H04N 21/436 | (2011.01) |
| H04N 21/6587 | (2011.01) |
| H04N 21/63 | (2011.01) |
| H04N 21/6377 | (2011.01) |
| H04N 21/234 | (2011.01) |
| H04N 21/472 | (2011.01) |
| H04N 21/422 | (2011.01) |

(52) U.S. Cl.
CPC ....... *H04N 21/4126* (2013.01); *H04N 21/234* (2013.01); *H04N 21/4131* (2013.01); *H04N 21/4222* (2013.01); *H04N 21/43615* (2013.01); *H04N 21/47217* (2013.01); *H04N 21/632* (2013.01); *H04N 21/6377* (2013.01); *H04N 21/6587* (2013.01)

(58) Field of Classification Search
CPC .......... H04N 21/4122; H04N 21/4126; H04N 21/41407; H04N 21/4333
See application file for complete search history.

(56) References Cited

U.S. PATENT DOCUMENTS

| | | | |
|---|---|---|---|
| 2007/0130604 A1* | 6/2007 | Han | H04N 21/4263 725/131 |
| 2009/0070840 A1* | 3/2009 | Kamimaki | H04N 7/17318 725/114 |

(Continued)

OTHER PUBLICATIONS

International Search Report and Written Opinion of the International Searching Authority for International Application No. PCT/US17/44882, dated Aug. 16, 2017 (10 pages).

*Primary Examiner* — Kyu Chae
(74) *Attorney, Agent, or Firm* — Sterne, Kessler, Goldstein & Fox P.L.L.C

(57) ABSTRACT

Disclosed herein are system, method, and computer program product embodiments for flexible output of streaming media. An embodiment operates by receiving, at a media server, media over a network. Output media, corresponding to the received media, is streamed to a display device. The output media includes a video component and an audio component. A command is received. Responsive to the command, the streaming of the video component to the display device is discontinued. A streaming of the video component is begun to a mobile device at a point in the video component corresponding where the video was discontinued.

19 Claims, 5 Drawing Sheets

(56) References Cited

U.S. PATENT DOCUMENTS

| | | | | |
|---|---|---|---|---|
| 2014/0173051 A1* | 6/2014 | Sagayaraj | ............... | H04W 4/18 |
| | | | | 709/219 |
| 2014/0298363 A1* | 10/2014 | Begeja | ................... | G06Q 30/02 |
| | | | | 725/1 |
| 2015/0358666 A1* | 12/2015 | Atake | ................ | H04N 21/4122 |
| | | | | 725/88 |
| 2016/0018959 A1* | 1/2016 | Yamashita | ............ | G06F 3/0484 |
| | | | | 715/716 |
| 2016/0077710 A1* | 3/2016 | Lewis | ................. | G06F 3/04842 |
| | | | | 715/716 |
| 2016/0191989 A1* | 6/2016 | Hardt | ............... | H04N 21/43615 |
| | | | | 725/25 |
| 2017/0187811 A1* | 6/2017 | Thomee | ................ | H04L 67/148 |

* cited by examiner

FLEXIBLE OUTPUT OF STREAMING MEDIA

BACKGROUND

With the growth of the Internet and network capabilities, streaming media has become one of the ways in which users receive media, such as video and audio. A streaming device can both receive media over a network and provide the received media to another device for consumption by a user. However, in a time when users have multiple devices (laptops, mobile phones, set top boxes, etc.) on which they can consume media, flexibility as to which devices receive which media is desirable.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

SUMMARY

Provided herein are system, apparatus, article of manufacture, method and/or computer program product embodiments, and/or combinations and sub-combinations thereof, that provide flexible output of streaming media.

An embodiment includes a computer implemented method for provides flexible output of streaming media. A method operates by receiving, at a media server, media over a network. Output media, corresponding to the received media, is streamed to a display device. The output media includes a video component and an audio component. A command is received. Responsive to the command, the streaming of the video component to the display device is discontinued. A streaming of the video component is begun to a mobile device at a point in the video component corresponding where the video was discontinued.

Additional embodiments include a system and a tangible computer-readable device having instructions stored thereon that, when executed by at least one computing device, causes the at least one computing device to perform operations substantially similar to the computer implemented method.

DETAILED DESCRIPTION

Provided herein are system, apparatus, device, method and/or computer program product embodiments, and/or combinations and sub-combinations thereof, for providing flexible output of streaming media.

Figure 1:
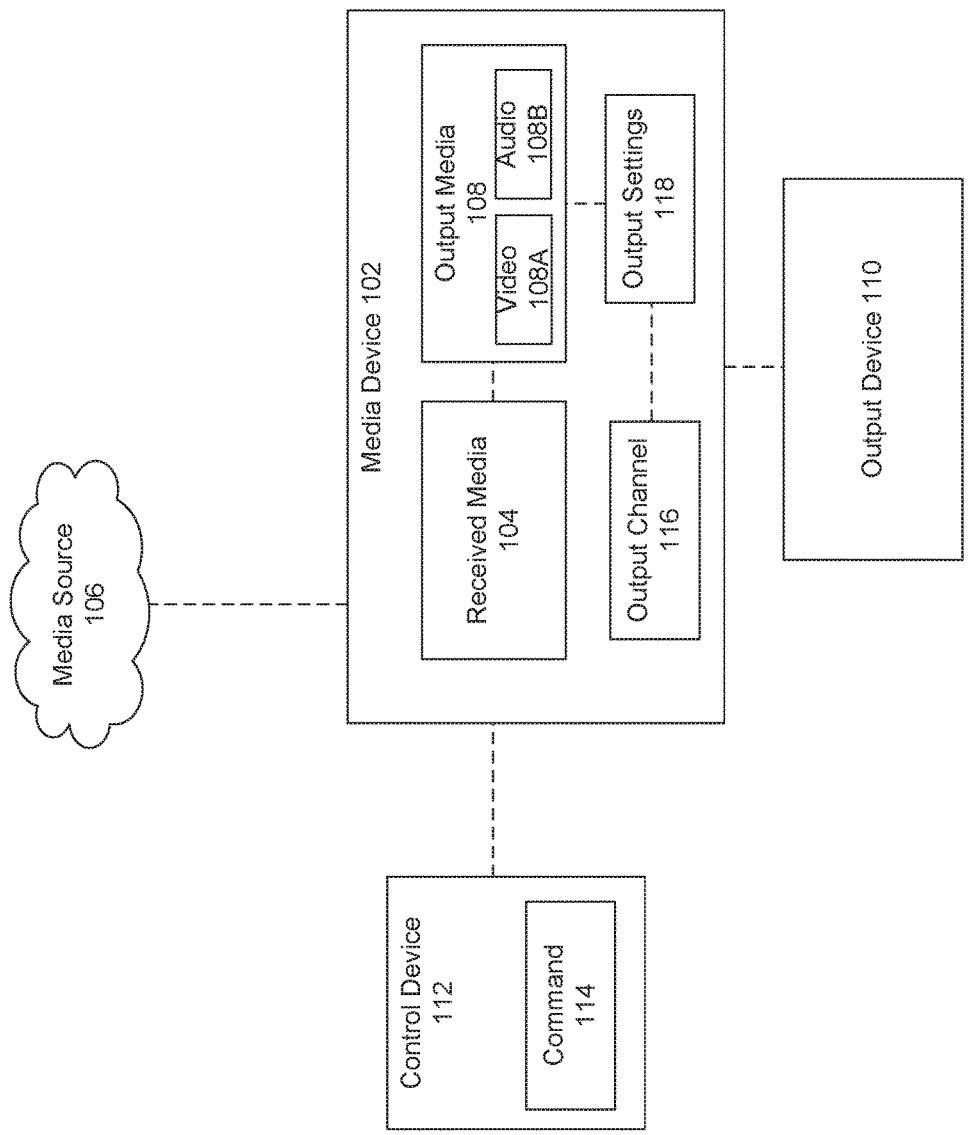
FIG. 1 is a block diagram of a system that provides flexible output of streaming media, according to an example embodiment.

FIG. 1 is a block diagram of a system 100 that includes a media streaming device, according to an example embodiment. A media device 102 may receive media 104, including but not limited to video, audio, images, multimedia, software, etc., from a media source 106 over a network. Media device 102 may transmit, provide, or otherwise make available the received media 104 to one or more output devices 110. System 100 provides flexibility as to which output devices 110 receive which media 108 from media device 102. In an embodiment, system 100 provides for videoless (also called "headless") operation of media device 102. System 100 provides for the flexible output of streaming and other media.

Media device 102 may be a set-top box, media server, laptop, tablet, smart phone, television (e.g., such as smart television configured to operate one or more third-party applications), desktop, or other device that is network enabled and enabled to receive content from any number of media sources 106. In an embodiment, media device 102 may be part of and incorporated in an output device 110. For example, output device 110 may be a television and media device 102 incorporated therein. Alternatively, media device 102 may be a separate device from output device(s) 110.

Media source 106 may be a content developer or provider that provides media content over a wired and/or wireless network to media device 102. For example, media source 106 may be an application that streams music, movies, or other media over the Internet. Example media sources 106 include but are not limited to Netflix, Hulu, HBOGo, Pandora, and Spotify. In an embodiment, media source 106 may include a server or group of servers that store and make accessible content to media device 102 via push or pull commands or on a free or paid subscription basis. The content or data from media source 106 may be received by media device 102 as received media 104.

In an embodiment, media device 102 may receive media 104 via a real-time stream, or received media 104 may have been previously received and locally stored or buffered by media device 102. Media device 102 may simultaneously receive media 104 from multiple media sources 106 or media channels and/or may simultaneously provide output media 108 corresponding to received media 104 to one or more output devices 110 or channels 116. In an embodiment, different media sources 106 may have their own apps operating on media device 102. Media device 102 may then deliver content, data, or received media 104 via the apps to one or more output devices 110.

The received media 104 may be assembled or buffered at media device 102 and provided as output media 108. Received media 104 and/or output media 108 may include video 108A and/or audio 108B output that is delivered or streamed through an app operating on media device 102.

In an embodiment, received media 104 may be enhanced, buffered, assembled, or otherwise processed at media device 102 to produce output media 108 which is provided to output device 110. The processing by media device 102 may include adding menu options, visual or audio enhancements, including ads, organization of data, or any other media or contextual enhancements. For example, received media 104 may include audio 108B only media. However, output media 108 may include a video component 108A that has been provided or assembled at media device 102 to provide enhanced output media 108. The video component 108A may include video related to the audio 108B, advertisements, closed caption information, ancillary information related to the audio 108B (such as artist information or music lyrics), or other visual components such as a screen saver.

Media device 102 may be wired or wirelessly connected to output device(s) 110. Output device 110 may receive (from media device 102) and output video 108A and/or audio 108B. For example, output device 110 may be a television that includes both a display screen for outputting video 108A and speakers for outputting audio 108B. Other example output devices include a laptop, tablet, desktop, mobile phone, remote control, a stereo, speakers/headphones, or a tactile output device.

In an embodiment, output media 108 may include both video 108A and audio 108B output. In other embodiments, output media 108 may include different and/or additional output or media as well, including multiple video or audio components, a high definition component, three-dimensional output components, a tactile component, etc.

In an embodiment, a user may desire to modify which media component(s) (e.g., video 108A or audio 108B) are being consumed by or provided to one or more output devices 110, or are otherwise being output by media device 102. For example, media device 102 may provide a user the opportunity to toggle the video 108A of a movie, turning it on or off, without stopping, pausing, or otherwise modifying or interrupting the stream of output media 102 (which may include audio 108B).

In an embodiment, using a control device 112, a user may toggle which output devices 110 receive which media (e.g., video 108A, audio 108B, etc.) on a device-by-device or media-by-media basis. For example, two output devices 110 may simultaneously receive the video 108A and audio 108B of output media (such as two televisions in different rooms in a user's house). The user may disable the video 108A in one room, while maintaining the video 108A in the other room and the audio 1089 in both rooms by adjusting output settings 118.

Or, for example, the user may desire to stop the video output 108A via output device 110 while beginning video 108A on control device 112 or another output device 110, continuing the video 108A or other output media 108A right where it was left off the first device 110, which may be performed by media device 102 without interrupting the output media stream 108 while adjusting system 100 to the new user-prescribed output settings 118. Or, for example, based on a command 114 received from control device 112, media device 102 may change the video output from a first television to a second television without interrupting the streaming output. Media device 102 may, responsive to a command 114, provide an output media 108 stream on the first television and also simultaneously stream output media 108 on the second television without interruption of the first stream. In an embodiment, video 108A and/or audio 108B may be received and/or delivered by media device 102 via a network or the cloud.

Control device 112 may be any device configured to communicate with and issue commands 114 to media device 102, including a remote control, mobile phone, laptop, joystick, or other wired/wireless remote control. In an embodiment, control device 112 may be an output device 110 configured to receive output media 108 over one or more output channels 116. Control device 102 may, for example, be a mobile phone or remote control communicatively coupled (wired or wirelessly) to media device 102.

Control device 102 may be used to control, set up, or otherwise interact with media device 102 by issuing one or more commands 114 that adjust output settings 118. Output settings 118 may indicate to which output device(s) 110 output media 108 (including video 108A and audio 108B) is provided, and over which channels) 116. For example, with a selection on control device 102, a user may turn off video 108A output from media device, turning off a screen of output device 110, while audio 108B output is provided through speakers of output device 110. Or, for example, user may turn off analog audio 108B output channel 116 while resuming or beginning audio 108B output on a digital or high definition output channel 116 without interruption of the output media audio 108B. Output settings 118 may be toggled or configured via control device 112.

Command 114 may be a request by a user to adjust output settings 118 of media device 102. Command 114 may cause media device 102 to modify which output media 108 (e.g., video 108A or audio 108B) or output channel(s) 116 are being used to provide output media 108 to which output device 110 (for exemplary purposes, only one output device 110 is shown in FIG. 1, however embodiments may include multiple output devices 110, control devices 112, media devices 102, media sources 106, and output channels 116). In an embodiment, media device 102 may receive media 104 from another media device 102.

Media device 102 may receive media 104 and separate or distinguish the received media between video 108A and audio 108B. Then when outputting media 108, media device 102 may provide output media 108 via one or more channels 116. A particular output channel 116 may be configured provide data to a particular device or port, network, and/or may be configured to transmit a dedicated type of media (e.g., video 108A or audio 108B).

For example, output channel 116 may include both video 108A and audio 108B output to a television. Or, for example, output channel 116 may include audio only output to a speaker system. Or, for example, output channel 116 may be a wireless output to a network including video 108A or audio 108B, which is then received by one or more devices 110, 112. In different embodiments, different output channel 116 configurations may exist, which may include both wired (such as HDMI (high definition multimedia interface)) or wireless output.

In an embodiment, with the click of a single button (or menu selection) on control device 112, media device 102 may pause/stop video 108A output, while continuing audio 108B output. With a second button click the video 108A may be resumed, while the audio 108B is paused/stopped. With a third click, both may be resumed in normal operation, or transferred to another output device 110, including control device 112 which may have video and/or audio capabilities. These button clicks may be shortcuts to adjust output settings 118.

Some embodiments support different configurations for output settings 118 based on what a user desires. For example, a user and her family may be watching a movie with both video 108A and audio 108B on a television 110. The user however may need to leave the room to make popcorn but does not want to interrupt the movie for the rest of her family. Accordingly, the user may adjust output settings 118 such that the movie streams video 108A and/or audio 108B to her mobile phone 112 while the user is making popcorn, while simultaneously the video 108A and audio 108B continue to be streamed to the television 110. Then when the user returns to the room, the output settings 118 may be toggled back to normal operation via the television 110 only. Media device 102 may perform or provide output media 108 in whatever manner output settings 118 are adjusted.

As another example, output device 110 may be outputting music videos that include both a video 108A and an audio 108B component. A user may then configure output settings 118 such that only audio 108B is output via output device 110, while video 108A is discontinued. Media device 102 may continue to stream or provide output media 108 (e.g., including audio 108B) without interruption while simultaneously discontinuing the video portion 108A of output media 108. In an embodiment, configuring output settings 118 to discontinue video 108A may cause media device 102 to turn off the display screen of output device 110, cause display screen to go dark or black, display a screen saver, toggle a video output channel 116 between being on/off, or simply buffer or no longer stream, provide, or receive output video 108A.

Similarly, if a user desires, the user can toggle on/off audio 108B in the same way video 108A has been described herein. For example, output settings 118 may be configured such that audio 108B is output via two or more channels 116 simultaneously. In an embodiment, a user may have difficulty hearing audio 108B via output device 110. As such, the user may configure output settings 118 to stream audio via a second output device 110 (e.g., mobile phone or wireless headphones) with its own volume feature, such that the user may listen to the audio 108B corresponding to the video 108A that other people may be consuming via output device 110. However, this separate configuration option allows the user to increase the volume to his/her desired level of output, without disturbing, interrupting, or adjusting the volume on output device 110 which may be at a desired or preferred level for other users.

Figure 2:
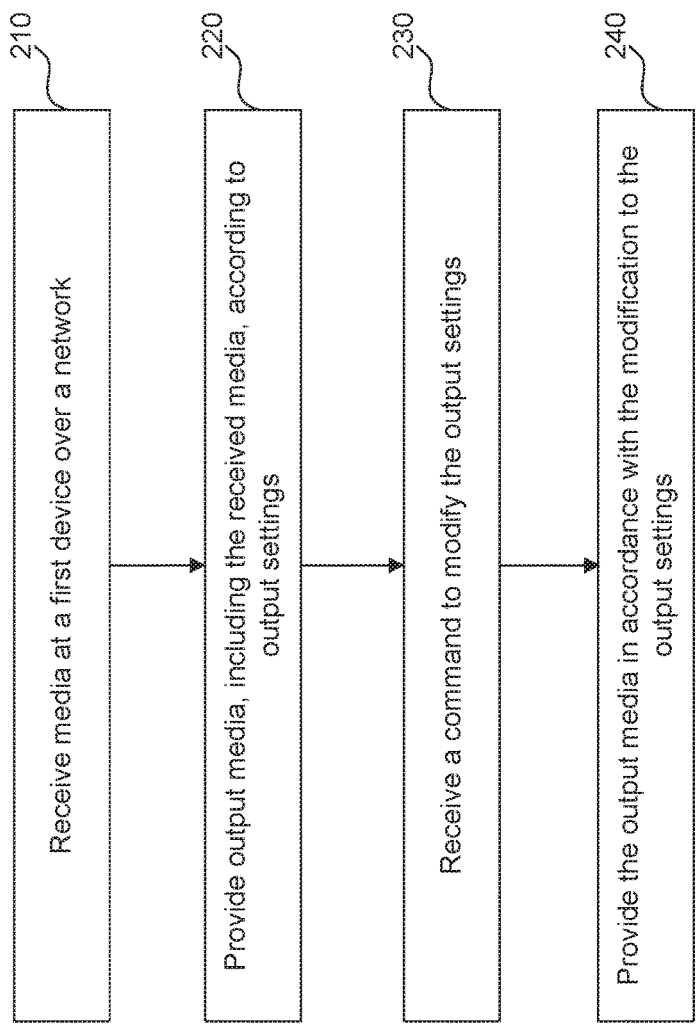
FIG. 2 is a flowchart of a method for providing flexible output of streaming media, according to an embodiment.

FIG. 2 is a flowchart for a method 200 for providing flexible output of streaming media, according to an embodiment. Method 200 can be performed by processing logic that can comprise hardware (e.g., circuitry, dedicated logic, programmable logic, microcode, etc.), software (e.g., instructions executing on a processing device), or a combination thereof.

At step 210, media is received at a first device over a network. For example, media device 102 may receive media 104 over a network from media source(s) 106. Media source 106 may be any content provider or server that has media that may be output to a user. Example media includes music, movies, shows, books, articles, photos, games, or other media or multimedia. In an embodiment, media device 102 may be a streaming media device that streams or relays the received media 104 to one or more other devices 110 for output (e.g., via video and/or audio display).

At step 220, output media, including the received media, is provided to one or more output devices 110 according to output settings. For example, output settings 118 may indicate to which device(s) 110, 112 and/or channels 118 output media 108 is to be provided. Output settings 118 may be configured to determine or adjust both video 108A and audio 108B components of output media 108. Output channels 116 may include video-only, audio-only, or both video and audio output channels. Output media 108 delivered via an output channel 116 may be received by one or more output devices 110 configured to output that type (e.g., video or audio) of media.

At step 230, a command to modify the output settings is received. Media device 102 may receive command 114 from control device 112. Control device 112 may be any device (such as a remote control, mobile phone, tablet, or laptop) that is configured to operate media device 102. In an embodiment, command 114 may be received by the user pressing one or more buttons on touch screen, or pressing buttons on media device 102 itself.

Command 114 may be any command for adjusting, modifying, or toggling output settings 118. Command 114 may, for example, cause one of video 108A or audio 108B to be stopped or no longer provided to output device 110, while the other output media component continues to play or be provided. Or, for example, command 114 may indicate that output media 108 (including video 108A or audio 108B) is to be provided to a different output device 110 or 112 without interrupting the current output to output device 110.

At step 240, the output media is provided in accordance with the modification to the output settings 118. For example, media device 102 may discontinue or begin outputting video 108A and/or audio 108B via one or more output channels 116 or output devices 110. In an embodiment, adjusting, discontinuing, or beginning one stream of output (e.g., video 108A or audio 108B) via one or more output channels 116 or output devices 110 does not interfere with the continued operation of media device 102 to output the remaining stream(s) of media 108.

Figure 3:
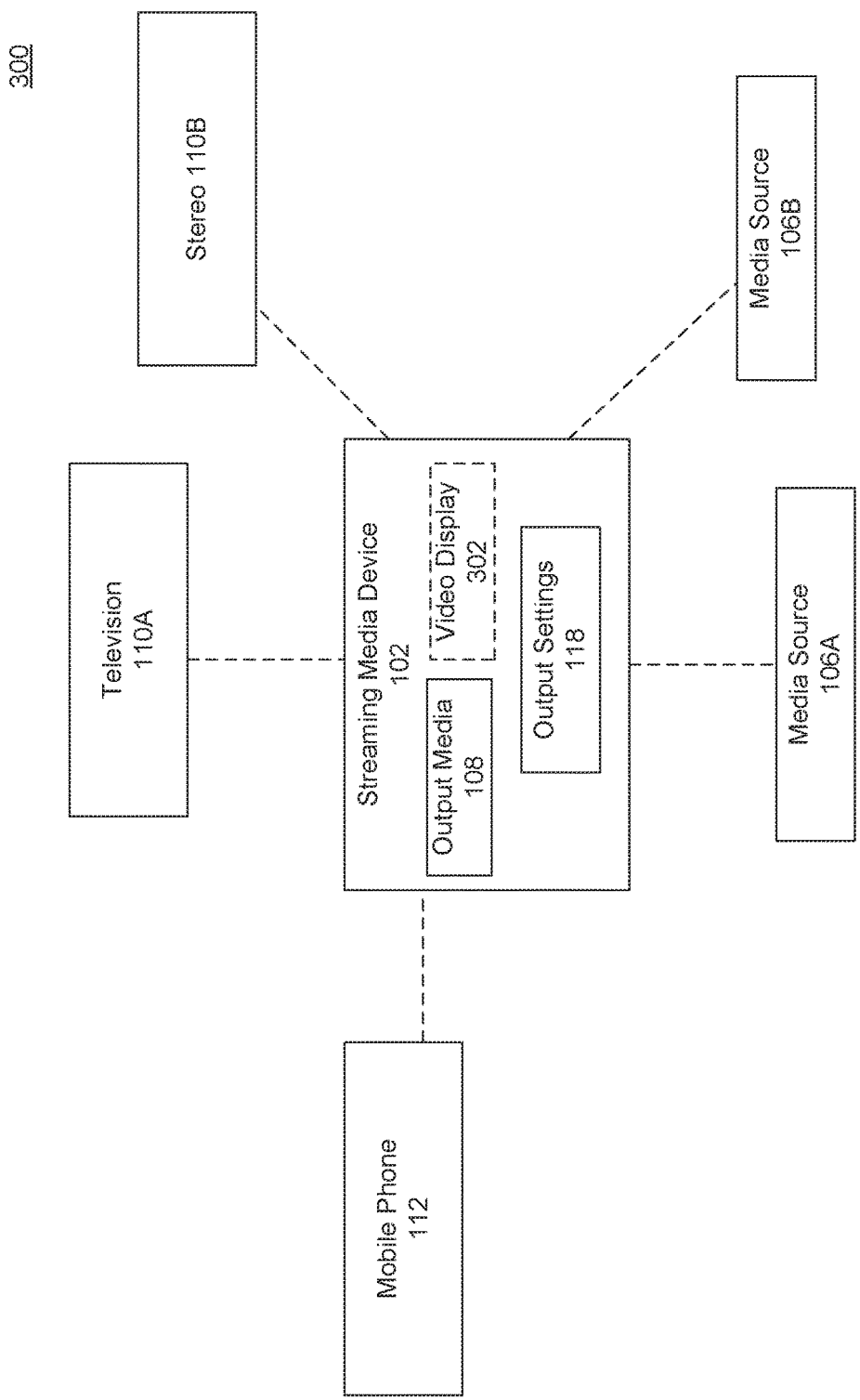
FIG. 3 is a block diagram of a system provides flexible output of streaming media, according to another example embodiment.

FIG. 3 is a block diagram of a system 300 that provides flexible output of streaming media, according to another example embodiment. Streaming media device 102 may receive media from multiple media sources 106A, 106B over a wired and/or wireless network (such as the Internet and/or cellular networks). Media sources 106A, 106B may be subscription channels (such as HBO, Showtime, Cinemax), content providers (such as Pandora, Netflix, Youtube), or other sources of media (including local or private servers that have media and other data accessible to streaming media device 102).

Streaming media device 102 may then output the received media as output media 108, In an embodiment, output media 108 may include media or data received from media sources 106A, 106B that has been formatted or edited by streaming media device 102 or an associated media processing service. For example, streaming media device 102 may display a video screen from which a user may select any number of icons associated with consuming different content from different media sources 106A, 106B, As such, output media 108 may include both received data and data that has been added to or otherwise used to enhance received data.

One example of media that may be output is video display 302. Video display 302 may be a configuration, setup, or access menu that may be used by a user to access, set up, or control streaming media device, including changing output settings 118. Streaming media device 102 may provide output media 108 according to output settings 118, which may indicate which devices 110A, 110B, 112 receive which (if any) output media 108 (e.g., video and/or audio media components).

For example, television 110A may receive both video and audio output media 108, while stereo 110९ may receive only audio output media 108, In an embodiment, mobile phone 112 (which may include a remote control) may be configured to interact with or control streaming media device 102. For example, television 110A may display video display 302 which allows a user to set up or select which media (e.g., from which media sources 106A, 106B) the user desires to consume or stream and on which device(s) 110A, 110B. Video display 302 may enable a user to configure output settings 118 according to a user's preferences.

Using mobile phone 112 or other control device 112, a user may place system 300 into a videoless or headless mode in which video display 302 is no longer accessible/viewable via television 110A. For example, mobile phone 112 may toggle a command to discontinue video output of output media 109 to all devices 110, or just to television 110A, Streaming media device 102, upon processing the command from mobile phone 112, may discontinue the video output media 108, while continuing any audio output media 108 uninterrupted.

Because video output may have been discontinued or stopped on television 110A, video display 302 (used to toggle output settings 118) may no longer be visually accessible on television 110A. However, media device 102 may continue to stream video to mobile phone 112, in which case a user may continue to operate and command streaming media device 102 via menu options displayed and available on mobile phone 112. For example, a user may desire to discontinue video output 108 on television 110A, but begin streaming video output 108 on mobile phone 112 at the point when video output 108 was discontinued to television 110A. Accordingly, stream media device 102 may switch the video output to mobile phone 112, discontinue the video output to television 110A, while simultaneously continuing to output audio 108 to television 110A and stereo 110B (as may have been previously configured in output settings 118).

Figure 4:
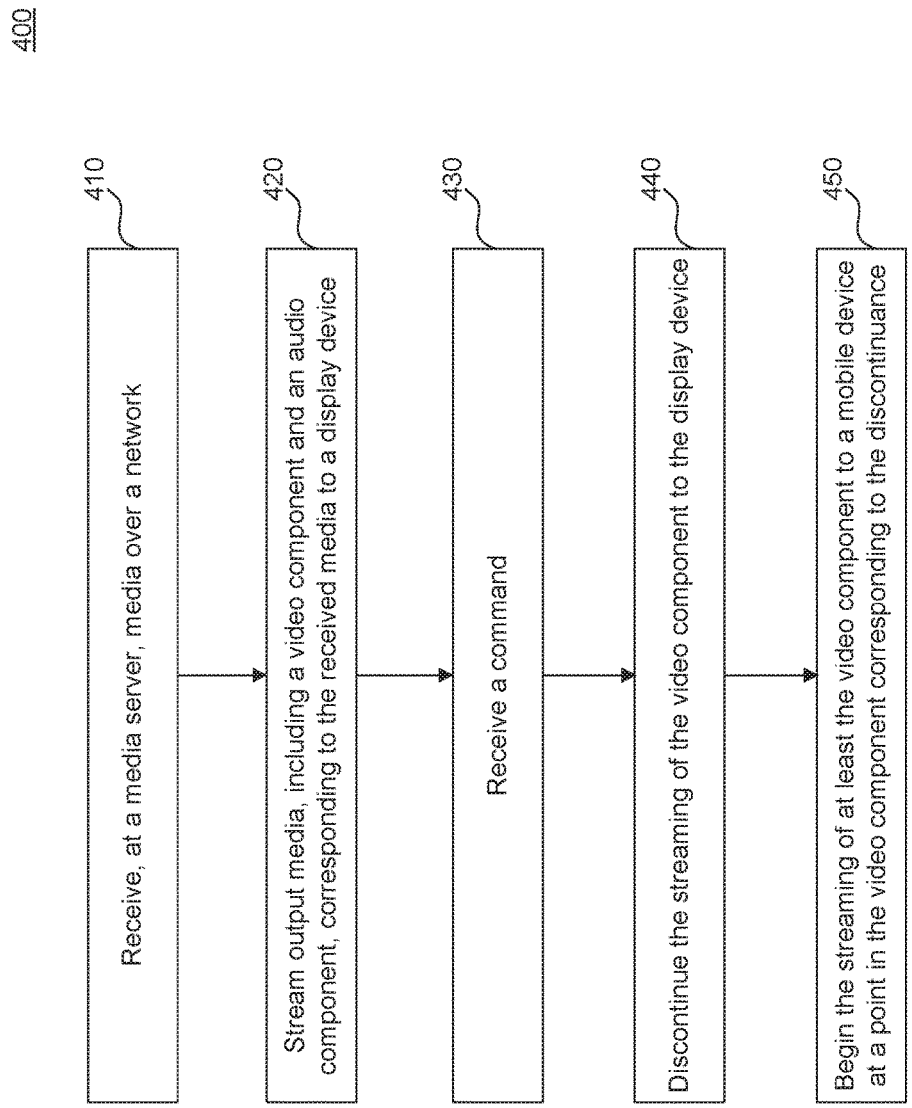
FIG. 4 is a flowchart of a method for providing flexible output of streaming media, according to another embodiment.

FIG. 4 is a flowchart for a method 400 for providing flexible output of streaming media, according to another embodiment. Method 400 can be performed by processing logic that can comprise hardware (e.g., circuitry, dedicated logic, programmable logic, microcode, etc.), software (e.g., instructions executing on a processing device), or a combination thereof.

At step 410, media is received at a media server over a network. For example, media device 102 may receive media 104 over a network from one or more media sources 106. The received media 104 may include text, audio, video, books, software, or other media or multimedia or data.

At step 420, output media, including a video component and an audio component, corresponding to the received media is streamed to a display device. For example, media device 102 may provide output media 108, including video component 108A and audio component 108B, to one or more output devices 110. Output settings 118 may indicate which components 108A, 108B are provided to which output devices 110 over which output channel(s) 116.

At step 430, a command is received. For example, media device 102 may receive command 114 from control device 112. Command 114 may indicate that output settings 118 are to be adjusted, such that the output settings 118 of one or more of output media 108, output channels 116, or output devices 110 are adjusted. For example, command 114 may indicate that video 108A to output device 110 is to be discontinued. Command 114 may also, or a second command 114 may indicate that video 108A is to be continued on a second output device 110 or via a different channel 116 and/or audio to the first output device 110 is to resume uninterrupted.

At step 440, the streaming of the video component to the display device is discontinued. For example, as noted above, media device 102 may provide output media. 108 in accordance with output settings 118 adjusted by command 114. In an example, video 108A to a first output device 110 may be paused or stopped. However, audio 108B to the first output device 110 may resume uninterrupted.

At step 450, the streaming of at least the video component is begun to a mobile device at a point in the video component corresponding to the discontinuance. For example, command 114 may indicate that control device 112 is to receive the video 108A that has been discontinued from output device 110, Then, in accordance with the adjusted output settings 118, mobile device may provide video 108A to control device 112 via output channel 116 (which may be the same or different output channel 116 used to provide video 108A to output device 110) where just before or after) video 108A to output device 110 was discontinued.

Figure 5:
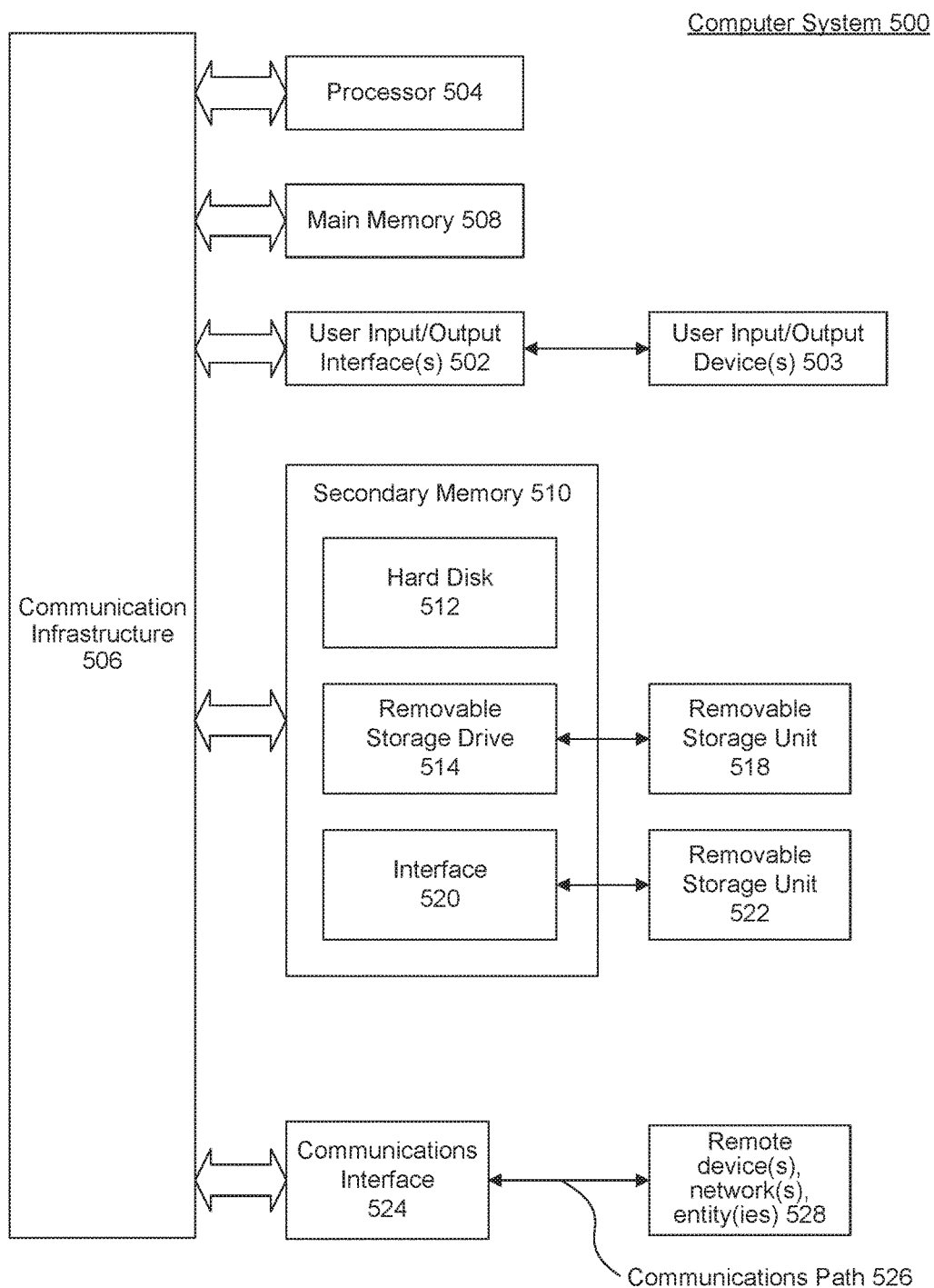
FIG. 5 is an example computer system useful for implementing various embodiments.

Various embodiments can be implemented, for example, using one or more computer systems, such as computer system 500 shown in FIG. 5. Computer system 500 can be used, for example, to implement method 500 of FIG. 5. For example, computer system 500 can determine a resource block allocation of a portion of a tone space using a lookup table. Computer system 500 can further map a plurality of tones to a resource block based on the determined resource block allocation, according to some embodiments. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache, Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   receiving, at a media server, media over a network;
   streaming the received media to a display device that is configured to play the streamed media, wherein the streamed media includes a video component and an audio component;
   determining that a command menu to adjust the video component and audio component is available via the display device;
   receiving a command to begin streaming the video component to a mobile device;
   responsive to the command, turning off the video component to the display device while the audio component of the display device remains on, and beginning the streaming of the video component and the audio component to the mobile device at a point in the video component corresponding to the turning off; and
   determining that the command menu is accessible via the mobile device after the video component to the display device is turned off, wherein the command menu includes output settings that indicate to which one or more devices the video component and audio component can be streamed.

2. The method of claim 1, wherein the media server is part of the display device.

3. The method of claim 1, wherein the command is received from the mobile device.

4. The method of claim 1, wherein the command is received from a control device different from the mobile device.

5. The method of claim 1, wherein the command menu is accessible on the display device prior to the discontinuance of the streaming of the video component to the display device.

6. A system comprising
   a memory, and
   at least one processor coupled to the memory and configured to:
      receive, at a first media server, media over a network;
      stream the received media to a display device that is configured to play the streamed media, wherein the streamed media includes a video component and an audio component;
   receive a command;
      determine that a command menu to adjust the video component and audio component is available via the display device;
      receive a command to begin streaming the video component to a mobile device;
      responsive to the command, turn off the video component to the display device while the audio component of the display device remains on, and beginning the streaming of the video component and the audio component to the mobile device at a point in the video component corresponding to the turning off; and determine that the command menu is accessible via the mobile device after the video component to the display device is turned off, wherein the command menu includes output settings that indicate to which one or more devices the video component and audio component are being streamed.

7. The system of claim 6, wherein the media server is part of the display device.

8. The system of claim 6, wherein the command is received from the mobile device.

9. The system of claim 6, wherein the command is received from a control device different from the mobile device.

10. The system of claim 6, wherein the streaming comprises: providing a representation of the received media and the command menu via the video component.

11. The system of claim 10, wherein the command menu is not visually accessible on the display device after discontinuance of the video component streaming, but is visually accessible on the mobile device.

12. A tangible computer-readable device having instructions stored thereon that, when executed by at least one computing device, causes the at least one computing device to perform operations comprising:

receiving, at a media server, media over a network;

streaming output media corresponding to the received media to a display device, wherein the output media includes a video component and an audio component;

determining that a command menu to adjust the video component and audio component is available via the display device;

receiving a command to begin streaming the video component to a mobile device;

responsive to the command, turning off the video component to the display device while the audio component of the display device remains on, and beginning the streaming of the video component and the audio component to the mobile device at a point in the video component corresponding to the turning off; and determining that the command menu is accessible via the mobile device after the video component to the display device is turned off, wherein the command menu includes output settings that indicate to which one or more devices the video component and audio component can be or are being streamed.

13. The device of claim 12, wherein the media server is part of the display device.

14. The device of claim 12, wherein the command is received from the mobile device.

15. The device of claim 12, wherein the command is received from a control device different from the mobile device.

16. The device of claim 12, wherein the output media comprises a representation of the received media and the command menu.

17. The method of claim 1, wherein the turning off comprises signaling the video component of the display device to go dark.

18. The method of claim 1, wherein the command is received from the mobile device.

19. The method of claim 1, wherein the turning off comprises initiating a screen saver.

* * * * *